United States Patent
Isom et al.

(10) Patent No.: US 10,267,669 B2
(45) Date of Patent: Apr. 23, 2019

(54) ESTIMATION OF GROSS WEIGHT AND CENTER-OF-GRAVITY

(71) Applicant: Sikorsky Aircraft Corporation, Stratford, CT (US)

(72) Inventors: Joshua D. Isom, Allentown, PA (US); Austin Fang, Fairfield, CT (US); Jonathan K. Wong, Trumbull, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 930 days.

(21) Appl. No.: 14/225,659

(22) Filed: Mar. 26, 2014

(65) Prior Publication Data
US 2015/0276538 A1 Oct. 1, 2015

(51) Int. Cl.
| | | |
|---|---|---|
| *B64C 17/00* | (2006.01) | |
| *G01G 19/07* | (2006.01) | |
| *G01M 1/12* | (2006.01) | |
| G05D 1/08 | (2006.01) | |
| G01M 1/28 | (2006.01) | |
| B64C 27/82 | (2006.01) | |
| G01G 19/08 | (2006.01) | |

(52) U.S. Cl.
CPC ............ *G01G 19/07* (2013.01); *G01M 1/127* (2013.01); *B64C 27/82* (2013.01); *G01G 19/086* (2013.01); *G01M 1/28* (2013.01); *G05D 1/0858* (2013.01)

(58) Field of Classification Search
CPC ........................ G05D 1/0858; B64C 2700/6281
See application file for complete search history.

(56) References Cited

U.S. PATENT DOCUMENTS

| 4,780,838 | A | 10/1988 | Adelson | |
|---|---|---|---|---|
| 5,682,335 | A * | 10/1997 | Assous | ............... G01R 33/025 33/318 |
| 5,987,397 | A | 11/1999 | Mccool et al. | |
| 7,532,988 | B2 | 5/2009 | Khibnik et al. | |
| 9,102,399 | B2 | 8/2015 | Sahasrabudhe et al. | |
| 2003/0139860 | A1* | 7/2003 | McBrien | .................. F02C 3/10 701/30.3 |
| 2010/0219987 | A1 | 9/2010 | Isom et al. | |
| 2011/0180656 | A1 | 7/2011 | Shue et al. | |
| 2013/0304400 | A1 | 11/2013 | Isom et al. | |

FOREIGN PATENT DOCUMENTS

| EP | 0502811 A2 | 9/1992 |
|---|---|---|
| EP | 2662741 A2 | 3/2013 |

OTHER PUBLICATIONS

Michael Abraham and Mark Costello; "In-Flight Estimation of Helicopter Gross Weight and Mass Center Location;" May 2009; Journal of Aircraft; vol. 46, No. 3; pp. 1042-1049.*

(Continued)

*Primary Examiner* — Mischita L Henson
*Assistant Examiner* — Christine Y Liao
(74) *Attorney, Agent, or Firm* — Cantor Colburn LLP

(57) ABSTRACT

Embodiments are directed to obtaining data from at least one sensor, the data pertaining to rotor loads and motion, processing, by a device comprising a processor, the data to obtain an estimate of at least one of gross weight (GW) and center of gravity (CG) for a rotorcraft, and outputting the estimate.

17 Claims, 4 Drawing Sheets

FIG. 1

(56) References Cited

OTHER PUBLICATIONS

Kun Chen, Hongbo Dong, and Kung-Sik Chan; "Reduced rank regression via adaptive nuclear norm penalization;" Sep. 25, 2012; Department of Statistics, Kansas State University; pp. 1-28.*
Fletcher, Jay W. "A Model Structure for Identification of Linear Models of the UH-60 Helicopter in Hover and Forward Flight." NASA, 1995, 90pgs.
Ganguli, Ranjan, and Inderjit Chopra. "Simulation of Helicopter Rotor-System Structural Damage, Blade Mistracking, Friction, and Freeplay." Journal of Aircraft, 1998: p. 591-597.
International Search Report for application PCT/US15/22620, dated Jul. 7, 2015, 7 pages.
Lin, Zhouchen, Minming Chen, and Yi Ma. "The Augmented Lagrange Multiplier Method for Exact Recovery of Corrupted Low-Rank Matrices." Technical Report, University of Illinois at Urbana-Champaign, 2010, Urbana-Champaign, 23 pgs.
Verdult, Vincent et al., "Identification of linear parameter-varying state-space models with application to helicopter rotor dynamics", Int. J. Control, 2005, vol. 77, No. 13, pp. 1149-1159.
Yuan, Ming, Ali Ekici, Zhaosong Lu, and Renato Monteiro. "Dimension Reduction and Coefficient Estimation in Multivariate Linear Regression." Journal of the Royal Statistical Society B, 2007: p. 329-346.
Zhou, Z., X. Li, J. Wright, E. Candes, and Ma Y. "Stable Principal Component Pursuit." 2010 IEEE International Symposium on Information Theory Proceedings. IEEE, 2010. 1518-1522.
The extended European Search Report; Application No. 15770210.1; dated Nov. 6, 2017; 10 sheets.

\* cited by examiner

ESTIMATION OF GROSS WEIGHT AND CENTER-OF-GRAVITY

BACKGROUND

Gross weight (GW) and center-of-gravity (CG) of an aircraft, such as a rotorcraft, impact the static and dynamic characteristics of flight. Accurate, in-flight estimation of the GW and CG can substantially improve performance. For example, knowledge or feedback of GW and CG can be used within a condition-based maintenance system, a health-and-usage management system, automatic flight controls, and mission planning systems.

Conventional techniques for estimating GW/CG include: (1) aircrew estimates, supplemented by correction for fuel weight using integrated fuel flow, (2) measurements of on-ground strain on landing gears, and (3) estimation of GW/CG from other measured aircraft state parameters. Practically, it is not feasible to rely on aircrew estimates for most applications. It is difficult to properly temperature-compensate measurements of landing gear strain. Estimate of GW/CG from other measured state parameters is difficult because GW/CG represent independent degrees of freedom for an aircraft. Moreover, measuring aircraft GW/CG in a hangar is time-consuming and merely serves as a crude estimate because GW/CG may change (e.g., due to fueling/de-fueling).

BRIEF DESCRIPTION OF THE INVENTION

Embodiments are directed to a method comprising: obtaining data from at least one sensor, the data pertaining to rotor loads and motion, processing, by a device comprising a processor, the data to obtain an estimate of at least one of gross weight (GW) and center of gravity (CG) for a rotorcraft, and outputting the estimate.

Embodiments are directed to an apparatus comprising: at least one processor, and memory having instructions stored thereon that, when executed by the at least one processor, cause the apparatus to: obtain data from at least one sensor, the data pertaining to rotor loads and motion, process the data to obtain an estimate of at least one of gross weight (GW) and center of gravity (CG) for a rotorcraft, and output the estimate.

Embodiments are directed to a rotorcraft comprising: a plurality of sensors configured to obtain data pertaining to rotor loads and motion, an analysis unit configured to: receive the data, process the data to obtain an estimate of gross weight (GW) and center of gravity (CG) for the rotorcraft, and output the estimate.

Additional embodiments are described below.

BRIEF DESCRIPTION OF THE DRAWINGS

The following descriptions should not be considered limiting in any way. With reference to the accompanying drawings, like elements are numbered alike.

DETAILED DESCRIPTION OF THE INVENTION

Figure 1:
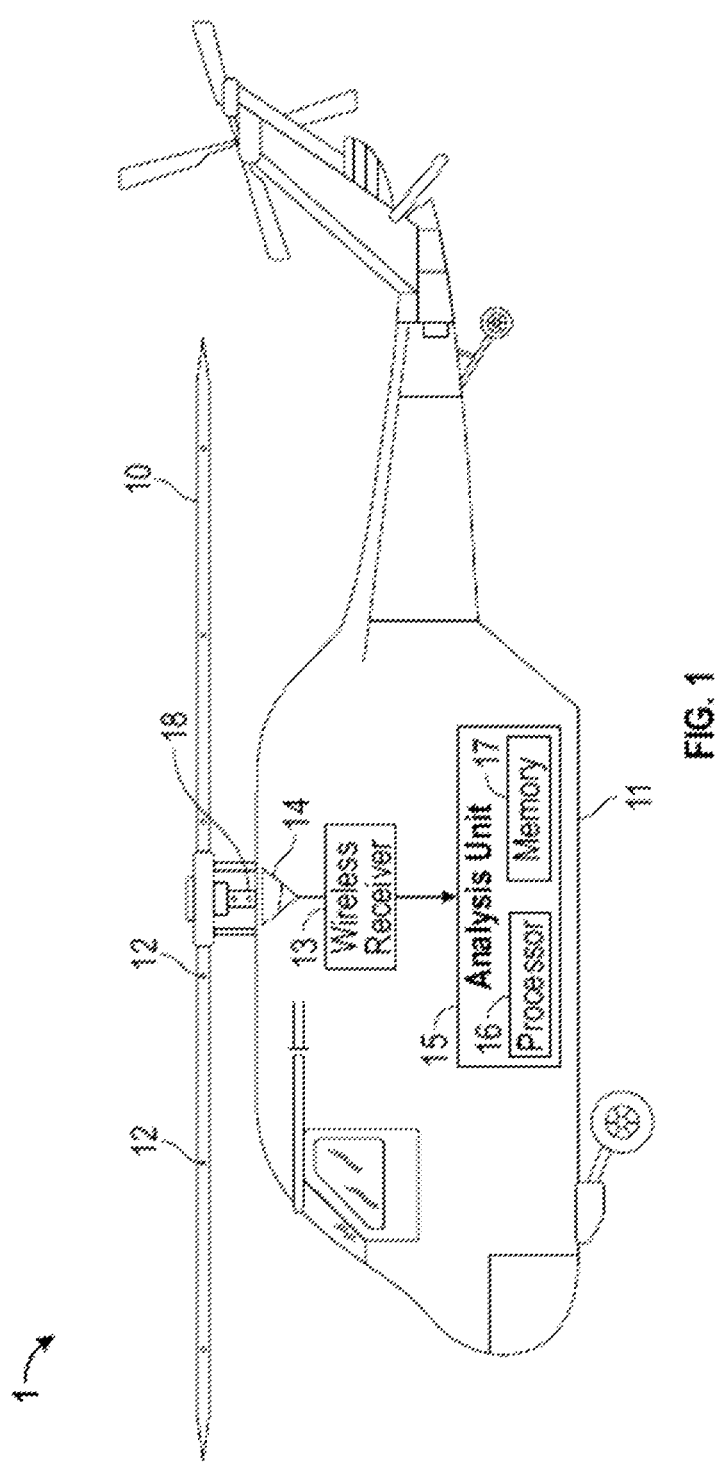
FIG. 1 is a diagram of a system for determining rotor loads and motion.

It is noted that various connections are set forth between elements in the following description and in the drawings (the contents of which are included in this disclosure by way of reference). It is noted that these connections in general may be direct or indirect and that this specification is not intended to be limiting in this respect. In this respect, a coupling between entities may refer to either a direct or an indirect connection.

Exemplary embodiments of apparatuses, systems, and methods are described for estimating gross weight (GW) and center-of-gravity (CG). The estimates may be based on rotor loads and motion. Measurements may be obtained via sensors (e.g., unreliable wireless sensor measurements). A model, such as a low-rank regression model, may relate the loads and motion waveforms obtained from one or more rotor revolutions to the GW and CG. Accurate estimates of GW and CG may be obtained even in the presence of noise or unreliable measurements of rotor loads and motion.

FIG. 1 illustrates a system 1 for determining rotor loads and motion in a vehicle, particularly in a rotary wing aircraft, such as a helicopter. The system includes a plurality of sensors 12 in the rotor blades 10 and the rotor shaft 18. The sensors 12 may include wireless transmitters to transmit data wirelessly to an antenna 14 and receiver 13. The sensors 12 may include, for example, strain gauges, magnetic Hall Effect sensors, temperature sensors, pressure sensors, magnetorestrictive sensors, accelerometers, and rate gyros. The sensors 12 may monitor the rotor blades 10 and shaft 18 to sense the loads and motion of the blades 10 and shaft 18, and the effect of perturbations in the aircraft state on the blades 10 and shaft 18. Perturbations in aircraft state may result in changes in the loads and motion of the blades 10 and shaft 18 including changes in blade flap, blade pitch, blade lead lag, main rotor shaft bending, main rotor shaft torque, and pitch rod loads, for example.

In exemplary embodiments, the wireless signals output from the sensors 12 are low-power wireless signals to prevent interference with control systems of the helicopter or to prevent detection of the helicopter from external sensors, such as ground-based receivers or receivers of other aircraft. Embodiments of the disclosure reconstruct sensor measurements lost or corrupted in wireless transmission, since the wireless signals may be subject to loss and error in transmission between the sensors 12 and the wireless receiver 13.

The receiver 13 transmits the sensed rotor data to an analysis unit 15, which includes a processor 16 to process the sensed data to replace and correct lost and erroneous data to accurately determine the loads and motion of the rotor blades 10. The analysis unit 15 may further include memory 17, supporting logic, and other circuitry necessary to analyze the sensor data and store and transmit the analyzed data. Examples of memory and supporting logic include hard disks, flash memory, volatile and non-volatile memory, field programmable gate arrays, multiplexers, and other memory and logic circuitry. According to one embodiment, the analysis unit 15 is located within the body 11 of the helicopter. According to an alternative embodiment, the analysis unit 15 is external to the helicopter. For example, the wireless receiver 13 may include a wireless transmitter, and the wireless transmitter may transmit the sensor data to an external analysis unit.

According to embodiments of the present disclosure, sensor data from the sensors 12 may be analyzed by the analysis unit 15 using numerical analysis for low-rank matrices to correct erroneous data and to provide missing data. The fact that numerical analysis for low-rank matrices is appropriate in this context may be due to at least four factors. First, in a system having a rotating component, such as the rotor blades 10 and shaft 18 of the helicopter, the data from the sensors in a rotating component is periodic. For example, the sensor data between one revolution and the next of the rotor blades 10 should be very similar if the state of the aircraft has not changed significantly. Second, sensor outputs in the rotor system of a helicopter are correlated with each other. For example, when the pitch of the rotor blades 10 is changed as a result of a pilot-initiated change in collective position, the output of the sensors will correlate with each other in the sense that the change in loads and motion induced by the change in collective is repeatable under any condition within the linear regime and proportional to the magnitude of the change in collective. Third, there is a large quantity of data gathered from multiple sensors over the period of one rotor revolution. Fourth, under a suitably broad range of flight conditions (a linear regime) the relationship between the state of the aircraft and the rotor loads and motion is a linear relationship. These four factors result in a loads and motion matrix that has a low rank.

The low rank nature of the loads and motion matrix enables powerful numerical techniques, which, in turn, may enable usage-based maintenance, life-improving control, structural health monitoring, aircraft vibration control, and individual blade control.

Whereas existing control models characterize linear relationships among aircraft states, and linear parameter-varying (LPV) models characterize linear relationships with the rotor system, the model described in the present embodiments is a framework for the linear relationship between the state variables of the aircraft and rotor loads and motion. The model adopted here is simpler than the LPV model adopted for the analysis of individual blade control, and relies only on the basic properties of differentiable quasi-periodic functions.

As described above, one or more models may relate loads and motion waveforms obtained from one or more rotor revolutions to aircraft GW and CG. For example, rotor loads and motion waveforms from one rotor revolution may be concatenated in a large vector, which may be multiplied by a low rank matrix to produce an estimate of GW and CG. Additionally, matrix completion techniques can be used to reconstruct missing data prior to GW/CG estimation, as described in U.S. patent application Ser. No. 13/468,698, filed May 10, 2012, and entitled "System And Method Of Determining Rotor Loads And Motion", the contents of which are incorporated herein by reference.

Rotor systems loads and motions may include blade flap, blade pitch, blade lead lag, main rotor shaft bending, main rotor shaft torque, and pitch rod loads. Under long-established practice, these loads are measured directly only during special test flights. For example, they may be used for calculation of substantiating load parameters needed for validation of a structural design of a rotor system. In some embodiments, this information may be available without special or dedicated equipment in regular flight. In some embodiments, this information may be available on the basis of virtual sensing or virtual monitoring.

In some embodiments, a linear regime may be used. In a linear regime for loads and motion, any rotor load or motion can be characterized by a reference waveform plus a small number of perturbation modes corresponding to aircraft degrees of freedom.

A loads and motion matrix obtained from a linear regime may have a very low rank. The low rank nature of the loads and motion matrix enables the application of powerful numerical techniques, which in turn enables usage-based maintenance, life-improving control, structural health monitoring, aircraft vibration control, and individual blade control.

Linear models may express derivatives of helicopter states in terms of linear combinations of the helicopter states and control inputs. Conventionally, some control models capture certain basic features of rotor loads and motion, such as the steady blade cone angle, but generally the control models make no attempt to fully characterize the waveforms associated with rotor loads and motion.

Conventionally, linear models have been proposed to model transfer functions among various load and motion states within a rotor system, with an eye towards application for active rotor control systems, such as HHC (higher harmonic control) and IBC (individual blade control) systems. The framework for linearization of rotor loads and motion under such models is a linear parameter-varying (LPV) state-space system, where coefficients for the state-space system vary periodically with rotor azimuth position due to periodic changes in aerodynamic and control boundary conditions.

Embodiments of the disclosure provide a framework for establishing a linear relationship between the state variables of an aircraft and rotor loads and motion. This model may be simpler than the LPV model adopted for the analysis of individual blade control, and may rely only on the basic properties of differentiable quasi-periodic functions.

Throughout the description below, italicized lower-case letters represent scalar variables, italicized upper-case letters represent matrices, and bold italicized lower-case letters represent vectors. The symbols j and k are used to signify integer indices, whereas the symbol i is the imaginary unit for complex numbers. Certain constants are associated with application of the framework to a particular helicopter system: m, the number of aircraft states; n, the number of sensors for rotor loads and motion; and p, the number of samples collected per sensor per revolution of the main rotor.

In forward flight, rotor loads and motion are a periodic function of the rotor azimuth position $\psi$. Thus any rotor load or motion variable y, as observed under a given aircraft state x, is a quasi-periodic function of $\psi\psi$ and has a Fourier series expansion:

$$y(\psi) = a_0(x) + \Sigma_{k=1}^{\infty}(a_k(x)\cos k\psi + b_{kn}(x)\sin k\psi) + \eta$$

where $\eta$ is non-periodic noise. Equivalently, using a complex representation with complex coefficients $c_k$, $$y(\psi) = \Sigma_{k=-\infty}^{\infty} c_{nk}(x) e^{ik\psi} + \eta, c_k = \overline{c_{-k}}. \quad (1)$$

The complex Fourier coefficients which fully characterize a rotor system load or motion can be expressed as a function of the aircraft state vector x, a function which has a Taylor series expansion around some reference point r (m being the number of state variables):

$$c_k(x) = c_k(r) + \frac{\partial c_k}{\partial x_1}(r)(x_1 - r_1) + \ldots + \frac{\partial c_k}{\partial x_m}(r)(x_m - r_m) + h_k(x)|x - r|,$$

$$\lim_{x \to r} h(x) = 0.$$

Examples of aircraft state variables which are components of x include pilot inputs, airspeed vector components, attitude, and attitude rates.

Within a linear regime, any rotor load or motion has a linear approximation $\widetilde{y(\psi)}$ around the chosen reference mode:

$$\widetilde{y(\psi)} = y_{ref}(\psi) + \Sigma_{k=1}^m z_k(\psi) u_k \quad (2)$$

where $u_k = x_k - r_k$ is the perturbation for the kith helicopter state. By equation (1), the reference load or motion waveform $y_{ref}(\psi)$ and its perturbation modes $\{z_k(\psi)\}_{k=1}^m$ are given by:

$$y_{ref}(\psi) = \sum_{k=-\infty}^{\infty} c_k(r) e^{ik\psi},$$

$$z_k(\psi) = \sum_{j=-\infty}^{\infty} \frac{\partial c_j}{\partial x_k}(r).$$

If the jth load or motion is sampled at discrete azimuth positions $0, \Delta\psi, 2\Delta\psi, \ldots$ over one rotor revolution, then $y^j = [y(0), y(\Delta\psi), y(2\Delta\psi), \ldots, y(2\pi - \Delta\psi)]$ and (2) can be written in vector form as:

$$y^j = y_{ref}^j + \sum_{k=1}^m z_k^j u_k.$$

The linearization error for a particular load at a particular azimuth position be expressed by:

$$y(\psi) - \widetilde{y(\psi)} = \sum_{k=-\infty}^{\infty} h_n(x)|x - r| e^{ik\psi} + \eta.$$

If $$(\Sigma_{k=-\infty}^{\infty} |h_k(x)|^2)^{1/2} |x-r| + |\eta| \le \epsilon \quad (3)$$

then $\|y(\psi) - \widetilde{y(\psi)}\|_2 \le \epsilon$. An $\epsilon$-linear regime for loads and motion is defined as a region of the aircraft state space in which the condition (3) is satisfied.

In the description that follows, it is useful to define a deviation of a loads and motion waveform from some reference (ref) waveform as:

$$w(\psi) = y(\psi) - y_{ref}(\psi).$$

Figure 2:
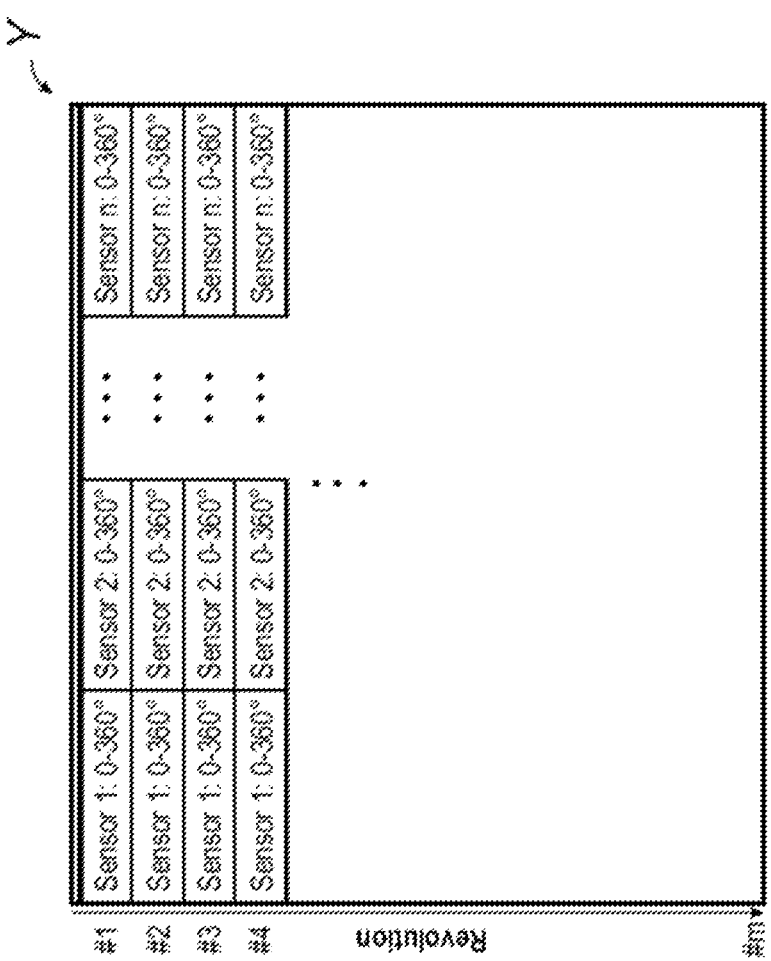
FIG. 2 is an exemplary structure for a loads and motion matrix in accordance with one or more embodiments.

As illustrated in FIG. 2, for the purpose of numerical analysis for low-rank matrices it may be useful to construct a loads and motion matrix Y, where each row of the matrix contains all of the loads and motion data $$[y^1, y^2, \ldots, y^n]$$

for one rotor revolution—a row has data from n multiple loads and motion variables, all sampled at multiple azimuth positions through the same revolution. A loads and motion perturbation matrix W may be constructed in the same way, using the loads and motion perturbations $w(\psi)$ for multiple loads, each sampled at multiple azimuth positions.

The matrices Y and W may have a rank that is low relative to the number of columns of the matrix, provided that there a modest number of loads and motion sensors available at a moderately high azimuthal sampling rate. For example, if there are 10 sensors in the rotor system sampled at a rate of 80 per rotor revolution, then the number of columns in the loads and motion perturbation matrix is 80*10=800. In contrast, the number of aircraft states, which corresponds to the rank of the matrix in a linear regime, is often taken to be on the order of 20 or 30.

A consequence of a linear regime is that, regardless of the number of rows or columns of W, the rank of the matrix in the absence of nonlinearities, noise, or sensor faults, should be m, the number of aircraft degrees of freedom. The row space of W is spanned by the m perturbation mode vectors $[z_1^1, z_1^2, \ldots, z_1^n], \ldots, [z_m^1, z_m^2, \ldots, z_m^n]$.

In some embodiments, one or more numerical techniques may be applied to analyze and estimate rotor system loads and motion. Such techniques include: 1) principal component analysis, 2) principal component pursuit, 3) matrix completion, and 4) nuclear-norm regularized multivariate linear regression. All techniques are possible because of the low inherent rank of the loads and motion matrix for a linear regime.

Principal component analysis can be used to find a low rank subspace of the loads and motion matrix that captures most of the variability in the data. Under the assumption that the impact of nonlinearities and noise on loads and motion are small relative to the linear perturbations, this low-rank subspace is spanned by the perturbation modes corresponding to aircraft state perturbations.

Principal component analysis may result in a decomposition of the load and motion perturbation matrix W as follows:

$$U\Sigma V^T \leftarrow W$$

where V and U are orthogonal matrices of appropriate size, $\Sigma$ is diagonal matrix of prescribed rank m. An approximation $\hat{W}$ of W that minimizes the norm $\|W - \hat{W}\|_2$ among all W of rank m or lower is given by $\hat{W} = WPP^T$, where P is a matrix with columns corresponding to the first m orthonormal columns of the matrix V. If m is chosen to correspond to the number of aircraft degrees of freedom, and all the data in W comes from a single $\epsilon$-Linear regime for loads and motion, then $\|W - \hat{W}\|_2 \le \epsilon$, by definition of an $\epsilon$-Linear regime for loads and motion. In the absence of sensor noise or other outliers, the singular value decomposition of the load and motion perturbation matrix produces in P an excellent estimate of the subspace spanned by the linear perturbation modes.

In some embodiments, principal component analysis may be used to empirically establish, e.g., ten loads and motion perturbation modes that capture most of the variability in the data. Linear regression may then be used to relate aircraft state perturbations to weightings for these empirical modes. An alternative which may offer better loads estimation performance is nuclear-norm regularized linear regression, which is described further below.

Principal component pursuit can be used to find noise, outliers, and nonlinearity that violate the characteristic low-rank structure of data in the loads and motion matrix.

In practice, the presence of noise and outliers in the data means that W has rank much larger than m. A formulated convex optimization problem allows one to decompose W as the sum W=L+S+N of a low rank matrix L, a sparse matrix S, and a dense but low magnitude noise matrix N.

The convex optimization problem may be stated as follows:

$$\text{minimize } \|L\|_* + \lambda \|S\|_1,$$

$$\text{subject to } \|W-S-L\|_F \leq \delta$$

If the approximate number of degrees of freedom m is known, and the magnitude of sensor noise known, then $\lambda$, and $\delta$ can be selected to yield L of rank m with a rowspace spanned by the linear perturbation modes. This estimate may be robust to noise and sparse outliers, whereas the estimate produced by principal component analysis may be sensitive to the presence of outliers. The entries of the sparse matrix S may capture outliers due to sensor faults, blade impacts, or other rare events. Finally, N may be an explicit estimate of low-magnitude noise associated with sensors or with small nonlinearities.

Figure 3:
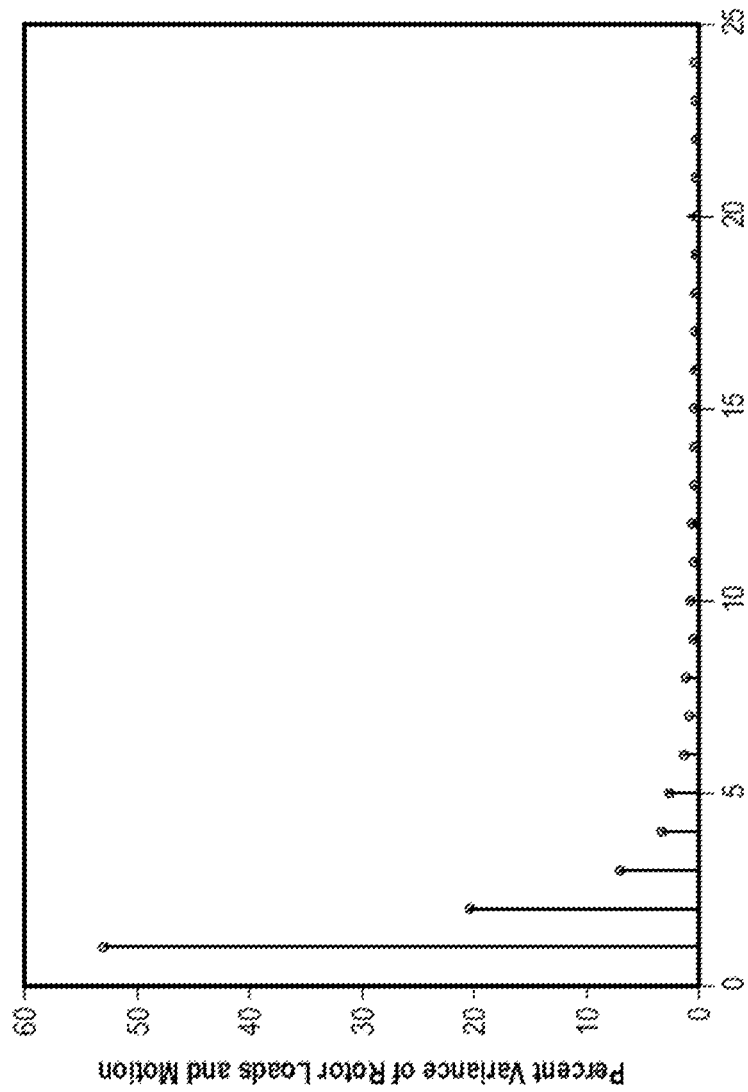
FIG. 3 is a diagram of relative magnitudes of a number of singular values for a loads and motion matrix in accordance with an embodiment.

The term $\|S\|_1$, equal to the sum of the absolute values of S, may be known as a sparsity-inducing norm because its use in an optimization problem tends to result in a small number of nonzero entries in the resulting optimal S. Other sparsity-inducing norms may be used profitably for the reconstruction of rotor loads and motion in the presence of corrupted or missing data. In particular, the $l_{1,2}$ or $l_{1,\infty}$ norms can be used to promote sparsity over sets of groups in a matrix, meaning that only a small number of groups would contain nonzero entries. Referring to FIG. 3, a fault in sensor 2 on a second rotor revolution may produce a group of corrupted values. The $l_{1,2}$ norm could be used with groups defined by the matrix entries for a particular sensor over a particular revolution.

Matrix completion can be used to reconstruct missing values of a load or motion matrix. This may become an important task when rotor loads and motion is captured using wireless sensors in the rotating frame. Data from wireless sensors is subject to drop-out, and thus a robust scheme for reconstruction of missing data may be useful.

A matrix completion problem may be defined as one in which missing entries of a low rank matrix need to be recovered. It has been proven that most matrices W of rank m containing missing data can be perfectly recovered by solving the following optimization problem:

$$\text{minimize } \|W\|_*,$$

$$\text{subject to } W_{ij} = D_{ij}, \forall (i,j) \in \Omega,$$

where $\Omega$ captures the location of non-missing data $D_{ij}$, provided that the number of samples in D is sufficiently large relative to the rank m of W and the number of columns of W.

Rotor systems loads and motion may be estimated from aircraft state. A general linear regression model may take the form:

$$W = UB + E,$$

where W is the loads and motion perturbation matrix, U is the state perturbation matrix, B is a matrix of regression coefficients, and E is the model error. The standard approach to estimating the coefficient matrix B is with ordinary least squares. The resulting estimates are equivalent to regressing each load on the state variables separately. However, such estimates may perform suboptimally since they do not utilize the information that the loads are correlated. It is also well known that this type of estimate performs poorly when the state matrix U has a rank that is low relative to the number of columns.

The following optimization problem has been proposed to solve for the low rank regression matrix B:

$$\text{minimize } \|W-UB\|_F^2 + \lambda \|B\|_*.$$

The above optimization problem amounts to minimizing the squared estimation error subject to a constraint on the rank of the regression model. This optimization scheme has been justified in terms of a low-rank factor model, and the results produced by the method have been shown to be superior to those produced by other commonly used regression techniques including ordinary least squares, reduced rank regression, partial least squares, principal components regression, and ridge regression. Once the regression matrix B has been determined, one can estimate the rotor system loads and motion using only knowledge of the aircraft state U.

Used individually or used together, the techniques of principal component pursuit, matrix completion, and nuclear-norm regularized multivariate linear regression can be used to 1) identify and correct corrupted loads and motion data, 2) reconstruct missing loads and motion data, and 3) estimate unmeasured loads and motion data using knowledge of the state of the aircraft.

Figure 4:
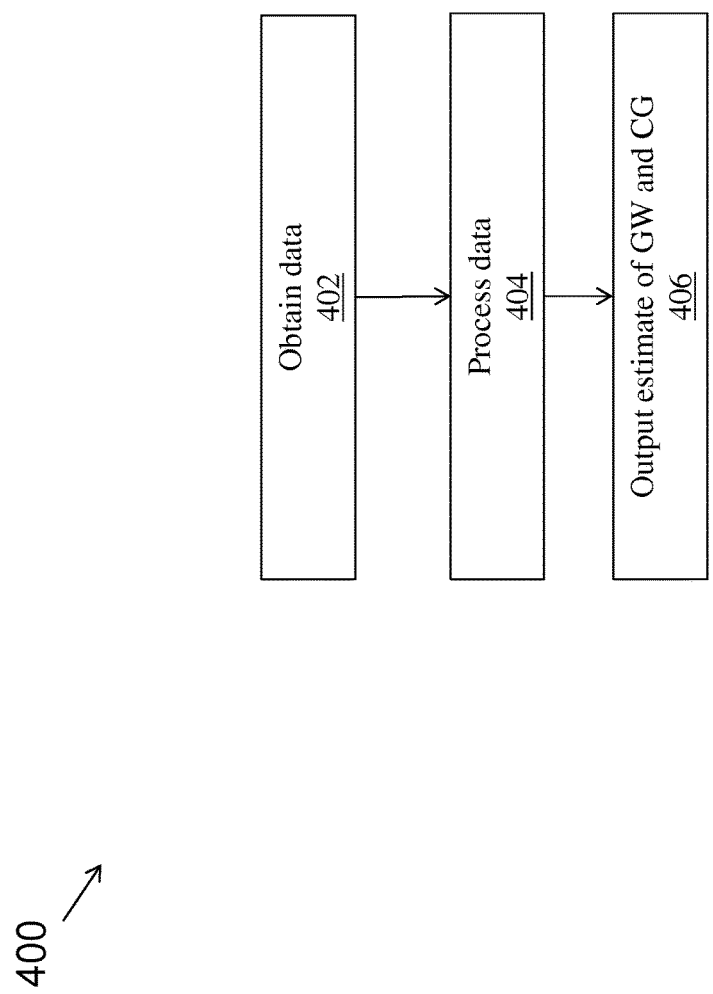
FIG. 4 is a flow diagram of a method according to one or more embodiments.

Referring to FIG. 4, a flow chart of an exemplary method 400 is shown. The method 400 may be used in connection with one or more components, devices, or systems, such as those described herein. The method 400 may be used to estimate GW and CG from rotor loads and motion. In some instances, sensors might not be ideally situated or positioned for determining GW and CG, and so a virtual monitoring of loads (VML) in accordance with the method 400 may be realized.

In block 402, data from one or more sensors may be obtained. The data may be obtained based on one or more rotor revolutions.

In block 404, the data may be processed. As part of block 404, rotor loads and motion waveforms from one rotor revolution may be concatenated in a vector, which may be multiplied by a low rank matrix.

In block 406, based on the processing of the data in block 404, an estimate of GW and CG may be output. For example, the estimate may be output in one or more forms, such as a displayed graphic, an email, a text message, an auditory message, etc.

The blocks or operations of FIG. 4 are illustrative. In some embodiments, the blocks or operations may execute in an order or sequence that is different from what is shown. In some embodiments, one or more of the blocks or operations (or a portion thereof) may be optional. In some embodiments, additional blocks or operations not shown may be included.

Embodiments of the disclosure may be applied in connection with one or more applications. Applications include 1) empirical estimation of rotor system loads and motion, based on the measured aircraft state, 2) life-improving controls, 3) detection and isolation of faults in sensors for measurement of loads and motion, 4) reconstruction of missing sensor data, 5) compression of loads and motion data, 6) detection and isolation of rotor-system structural faults and 7) estimation of helicopter gross weight and center of gravity. Some of these applications were already briefly mentioned above.

One application of linear regimes for rotor loads and motion, which was described above in connection with VML, is the estimation of rotor system loads and motion in the absence of sensors in the rotating frame. An implementation may use PCA to find a small number of loads and motion perturbation modes, and least-squares regression to establish a linear mapping between aircraft states and weightings for the perturbations modes. A low-rank multivariate linear regression may be used as an improved technique for establishing a more accurate mapping between aircraft states and rotor system loads.

The notion that rotor system loads can be estimated with the measurement of basic aircraft system states underlies technology for life-improving helicopter control.

Rotor loads and motion data may be collected by sensors which operate in a rotating, high vibration environment and the sensors themselves may be especially prone to faults. Principal component pursuit may be used to detect and isolate rotor system sensor faults.

The low-rank nature of the rotor system loads and motion matrix may permit reconstruction of missing data through the application of matrix completion techniques.

The low-rank nature of loads and motion data means that it is highly compressible. Specifically, for a given rotor revolution one need transmit only the coefficients for each perturbation mode to accurately reconstruct all the loads and motion data. The highly-compressible aspect of the data facilitates transmission and storage of this data.

VML may be used for the detection and isolation of rotor system structural faults. One can define a loads and motion fault perturbation mode in terms of the magnitude $f_j$ of the jth fault as follows:

$$m_i(\psi) = \sum_{n=-N}^{N} \frac{\partial c_n}{\partial f_i}(r)$$

Least squares can be used to solve for the fault magnitudes $\hat{f}$ from the overdetermined system of equations:

$$M_{fault} f = z$$

where $\hat{f}$ is a vector of the fault mode magnitudes, z is the residual loads and motion after subtraction of an estimate produced using Virtual Monitoring of Loads, and $M_{fault}$ is a matrix capturing fault perturbation modes. Since the columns of $M_{fault}$ are linearly independent, then $M_{fault}^T M_{fault}$ is invertible and a least squares estimate of the fault magnitude vector f is given by:

$$f = (M_{fault}^T M_{fault})^{-1} M_{fault}^T z.$$

The states of an aircraft may be measured and made available to a flight control system, a health and usage management system, and a mission planning system. Two aircraft states that have consistently eluded accurate measurement or estimation are aircraft GW and CG. Estimates of CG and GW of an aircraft may be used for condition based maintenance, flight control, and mission planning.

Embodiments of the disclosure provide a mathematical framework for a linear relationship between a state of an aircraft and rotor system loads and motion. A linear relationship between the state of the aircraft and rotor system loads and motion may result in a low-rank loads and motion matrix, which allows for application of powerful numerical techniques.

As described herein, in some embodiments various functions or acts may take place at a given location and/or in connection with the operation of one or more apparatuses, systems, or devices. For example, in some embodiments, a portion of a given function or act may be performed at a first device or location, and the remainder of the function or act may be performed at one or more additional devices or locations.

Embodiments may be implemented using one or more technologies. In some embodiments, an apparatus or system may include one or more processors, and memory storing instructions that, when executed by the one or more processors, cause the apparatus or system to perform one or more methodological acts as described herein. Various mechanical components known to those of skill in the art may be used in some embodiments.

Embodiments may be implemented as one or more apparatuses, systems, and/or methods. In some embodiments, instructions may be stored on one or more computer-readable media, such as a transitory and/or non-transitory computer-readable medium. The instructions, when executed, may cause an entity (e.g., an apparatus or system) to perform one or more methodological acts as described herein.

Aspects of the disclosure have been described in terms of illustrative embodiments thereof. Numerous other embodiments, modifications and variations within the scope and spirit of the appended claims will occur to persons of ordinary skill in the art from a review of this disclosure. For example, one of ordinary skill in the art will appreciate that the steps described in conjunction with the illustrative figures may be performed in other than the recited order, and that one or more steps illustrated may be optional.

What is claimed is:

1. A method comprising:
    obtaining data from at least one sensor disposed in a rotor blade of a rotorcraft at a plurality of rotor azimuth positions for a revolution of the rotor blade, the data pertaining to rotor loads and motion on the rotor blade;
    processing, by a device comprising a processor, the data to obtain an estimate of at least one of gross weight (GW) and center of gravity (CG) for the rotorcraft, wherein processing the data comprises:
        concatenating rotor loads and motion waveforms from the plurality of rotor azimuth positions over one rotor revolution to obtain a vector,
        multiplying the vector by a low rank matrix to reduce a rank of the vector; and
        relating the reduced vector to a vector representing a state of the rotorcraft to obtain the estimate;
    determining a linear relation between the state of the rotorcraft and a perturbation in the rotor blade; and
    controlling an aircraft state variable based on the determined linear relation between the state of the rotorcraft and rotor blade perturbations in order to control a rotor blade perturbation.

2. The method of claim 1, wherein the processing is performed to obtain an estimate of both GW and CG for the rotorcraft.

3. The method of claim 1, wherein the data is based on multiple rotor revolutions.

4. The method of claim 1, wherein the estimate is based on an application of a matrix completion technique to reconstruct missing data.

5. The method of claim 1, wherein a principal component analysis technique is applied to analyze and estimate rotor loads and motion in obtaining the estimate.

6. The method of claim 1, wherein a principal component pursuit technique is applied to analyze and estimate rotor loads and motion in obtaining the estimate.

7. The method of claim 1, wherein a nuclear-norm regularized multivariate linear regression technique is applied to analyze and estimate rotor loads and motion in obtaining the estimate.

8. An apparatus comprising:
   at least one processor; and
   memory having instructions stored thereon that, when executed by the at least one processor, cause the apparatus to:
      obtain data from at least one sensor disposed in a rotor blade of a rotorcraft at a plurality of rotor azimuth positions for a revolution of the rotor blade, the data pertaining to rotor loads and motion on the rotor blade;
      process the data to obtain an estimate of at least one of gross weight (GW) and center of gravity (CG) for the rotorcraft wherein processing the data comprises:
      concatenate rotor loads and motion waveforms from the plurality of rotor azimuth positions over one rotor revolution to obtain a vector,
      multiply the vector by a low rank matrix to reduce a rank of the vector; and
      relate the reduced vector to a vector representing a state of the rotorcraft to obtain the estimate;
      determine a linear relation between the state rotorcraft and a perturbation in the rotor blade; and
      control an aircraft state variable based on the determined linear relation between the state of the rotorcraft and rotor blade perturbations in order to control a rotor blade perturbation.

9. The apparatus of claim 8, wherein the instructions, when executed by the at least one processor, cause the apparatus to:
   process the data to obtain an estimate of both GW and CG for the rotorcraft.

10. The apparatus of claim 8, wherein the data is based on multiple rotor revolutions.

11. The apparatus of claim 8, wherein the estimate is based on an application of a numerical technique to analyze and estimate rotor loads and motion.

12. A rotorcraft comprising:
   a plurality of sensors disposed in a rotor blade of the rotorcraft configured to obtain data pertaining to rotor loads and motion on the rotor blade;
   an analysis unit configured to:
      receive the data from the plurality of sensors, wherein the data is obtained at a plurality of rotor azimuth positions for a revolution of the rotor blade;
      process the data to obtain an estimate of gross weight (GW) and center of gravity (CG) for the rotorcraft, wherein processing the data comprises:
         concatenating rotor loads and motion waveforms from the plurality of rotor azimuth positions over one rotor revolution to obtain a vector,
         multiplying the vector by a low rank matrix to reduce a rank of the vector; and
         relating the reduced vector to a vector representing a state of the rotorcraft to obtain the estimate;
      determining a linear relation between the state of the rotorcraft and a perturbation in the rotor blade; and
      control an aircraft state variable based on the determined linear relation between the state of the rotorcraft and rotor blade perturbations in order to control a rotor blade perturbation.

13. The rotorcraft of claim 12, wherein the analysis unit is configured to receive the data wirelessly.

14. The rotorcraft of claim 12, wherein the analysis unit is configured to detect and isolate faults based on a processing of the data.

15. The rotorcraft of claim 14, wherein the faults comprise faults associated with the sensors.

16. The rotorcraft of claim 14, wherein the faults comprise faults associated with a rotor system structure.

17. The rotorcraft of claim 12, wherein the analysis unit is configured to process the data based on coefficients for perturbation modes to reconstruct the rotor loads and motion.

* * * * *